(12) United States Patent  (10) Patent No.: US 7,677,633 B2
Brockhoff et al.  (45) Date of Patent: Mar. 16, 2010

(54) CONVERTIBLE VEHICLE AND HINGE DEVICE

(75) Inventors: Franz-Ulrich Brockhoff, Bramsche (DE); Winfried Bunsmann, Bissendorf (DE); Siegfried Licher, Georgsmarienhütte (DE)

(73) Assignee: Wilhelm Karmann GmbH, Osnabruck (DE)

( * ) Notice: Subject to any disclaimer, the term of this patent is extended or adjusted under 35 U.S.C. 154(b) by 796 days.

(21) Appl. No.: 10/564,326

(22) PCT Filed: Jul. 8, 2004

(86) PCT No.: PCT/DE2004/001485

§ 371 (c)(1),
(2), (4) Date: Aug. 4, 2006

(87) PCT Pub. No.: WO2005/007428

PCT Pub. Date: Jan. 27, 2005

(65) Prior Publication Data

US 2007/0132271 A1 Jun. 14, 2007

(30) Foreign Application Priority Data

Jul. 11, 2003 (DE) ................. 103 31 392

(51) Int. Cl.
*B60J 7/08* (2006.01)
(52) U.S. Cl. ................................. 296/107.08
(58) Field of Classification Search ............ 296/107.01, 296/17.08, 107.12
See application file for complete search history.

(56) References Cited

U.S. PATENT DOCUMENTS

| 6,048,021 A | 4/2000 | Sautter, Jr. |
| 6,145,915 A | 11/2000 | Queveau et al. |
| 6,347,827 B1 | 2/2002 | Maass |

FOREIGN PATENT DOCUMENTS

DE  94 19 035  3/1995

*Primary Examiner*—H Gutman
(74) *Attorney, Agent, or Firm*—Michael Best & Friedrich LLP

(57) ABSTRACT

In a convertible vehicle having a folding convertible top (16), whose rear side is affixed to a tensioning bow (20) laterally supported relative to the vehicle, and a rear trunk lid (14) laterally supported relative to the vehicle, wherein its front side is arranged in the vicinity of the tensioning bow in its closed state, the tensioning bow (20) can be brought into an upwardly pivoted position during the opening of the rear trunk lid (14) or when the rear trunk lid is opened, so that an opening for loading of a luggage compartment, which is arranged underneath the rear trunk lid and underneath the tensioning bow at least when the folding convertible top is closed, is enlarged.

24 Claims, 14 Drawing Sheets

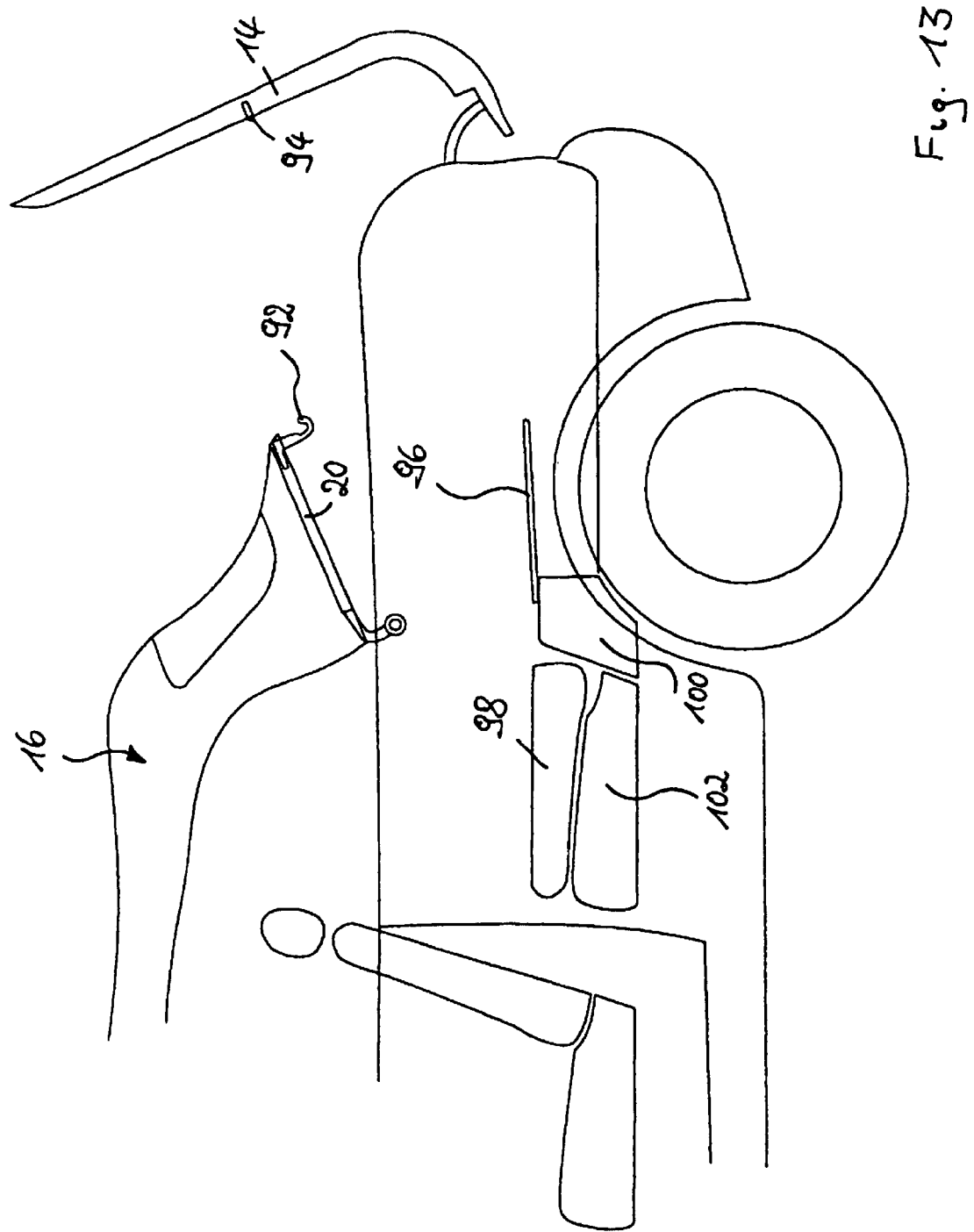

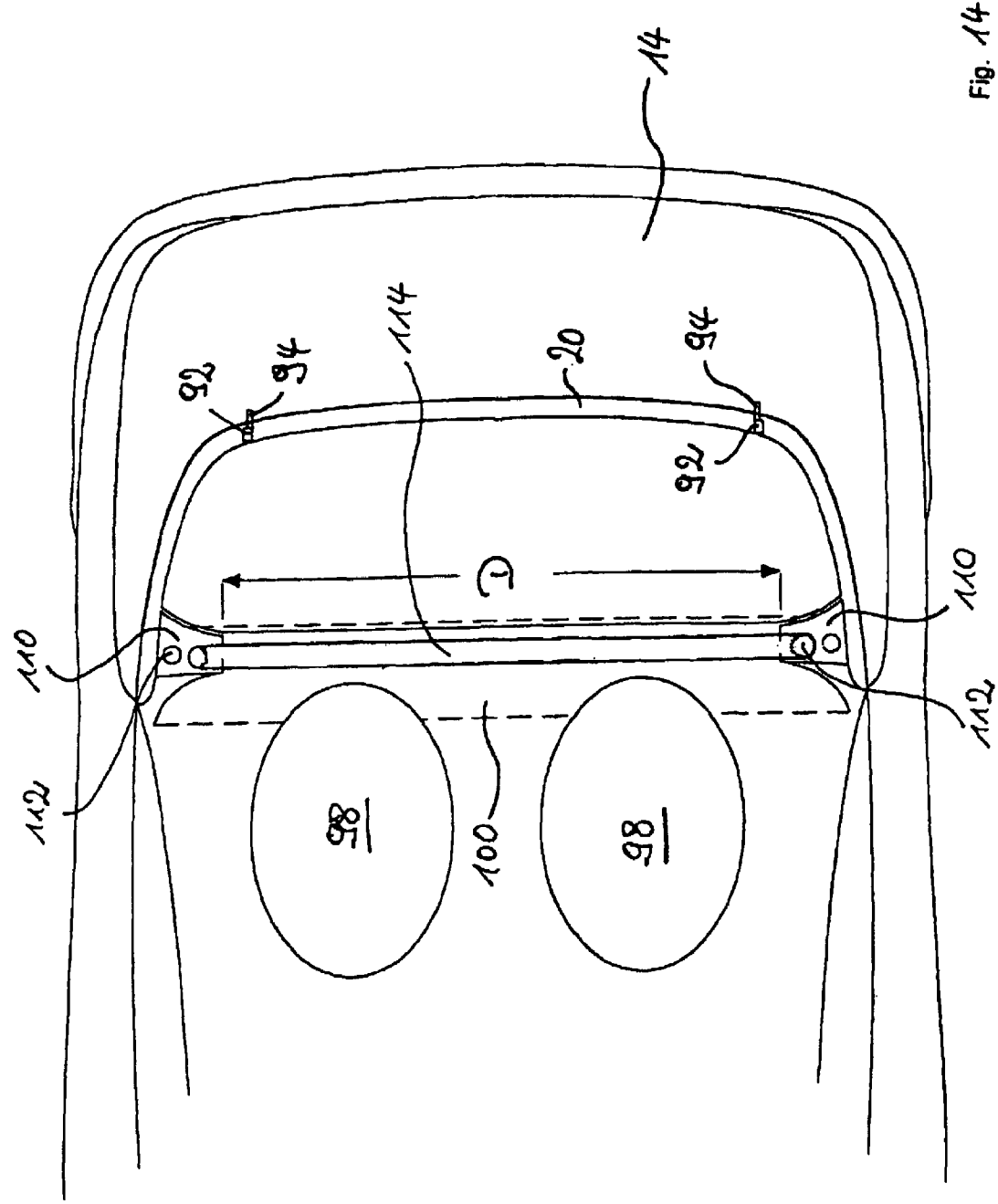

CONVERTIBLE VEHICLE AND HINGE DEVICE

CROSS-REFERENCE

This application is the US national stage filing of International Application No. PCT/DE2004/01485 filed Jul. 8, 2004, which claims priority to German patent application no. 103 31 392.3 filed Jul. 11, 2003.

TECHNICAL FIELD

The invention relates to a convertible vehicle, as well as a hinge device arranged between a rear trunk lid of a convertible vehicle and a tensioning bow for tensioning the rear side of the convertible top.

The invention relates to a convertible vehicle, as well as a hinge device arranged between a rear trunk lid of a convertible vehicle and a tensioning bow for tensioning the rear side of the convertible top.

BACKGROUND ART

Convertible vehicles are enjoying increasing popularity. When vehicles have a short rear end, a small clearance width results between the tensioning bow of the convertible top, which tensioning bow downwardly tensions the rear side of the convertible top, and the loading edge of the trunk space. At best, this small clearance width, which will be designated as the loading dimension (L206), is acceptable for an opened convertible top, when the convertible top, which is opened and mostly stowed in the trunk, severely reduces the volume of the trunk space. When the convertible top is closed, however the reduced loading dimension is very disadvantageous, because the capacity of the trunk space is then barely limited by the convertible top and can also accommodate larger objects.

In German Utility Model DE 94 19 035 U1, it is proposed to attach the rear side of the convertible top directly to the rear trunk lid, so that, upon opening the rear trunk lid, at least the rearward portion of the convertible top is correspondingly opened therewith, and the loading dimension is not compromised by the convertible top. A peculiarity of this proposal consists in that the opened convertible top lays on the rear trunk lid and must, as a whole, follow an opening of the rear trunk lid, whereby the convertible top kinematics are restricted.

SUMMARY

The object underlying the invention is to create a solution for the problem that, for vehicles having a short rear end and equipped with a convertible top, the loading capability of the trunk space is significantly restricted, without the existence of above-noted restrictions of the convertible top kinematics.

This object is solved with a convertible vehicle comprising a folding convertible top having a rear side affixed to a tensioning bow bearingly supported on the vehicle at both sides thereof, and a rear trunk lid bearingly supported on the vehicle at both sides thereof, wherein the front side of the rear trunk lid is arranged in the vicinity of the tensioning bow in its closed state. The tensioning bow is preferably movable into an upwardly pivoted position during the opening of the rear trunk lid or when the rear trunk lid is opened, so that an opening for loading of a luggage compartment, which is disposed underneath the rear trunk lid and underneath the tensioning bow at least when the folding convertible top is closed, is enlarged.

According to the inventive convertible vehicle, the rear trunk lid encompasses the tensioning bow of the convertible top from behind, so that it is recessed in correspondence to the shape of the tensioning bow, wherein, in particular in the middle region of the vehicle, the rear end of the rear trunk lid can be disposed only slightly behind the tensioning bow. The tensioning bow and the rear trunk lid are stored in their own storage spaces in the vehicle body, wherein for the opening up of an adequate luggage loading opening, the tensioning bow can be upwardly pivoted during opening of the rear trunk lid in coordination with the opening movement of the rear trunk lid or independent of the rear trunk lid.

In a preferred aspect of the present teachings, a hinge device is arranged between the rear trunk lid and the tensioning bow, which hinge device upwardly pivots the tensioning bow by opening the rear trunk lid. In addition or in the alternative, the tensioning bow preferably is pivotable independent of a pivoting of the rear trunk lid by opening the rear trunk lid.

In addition or in the alternative, an engagement device is preferably operative between the front side of the rear trunk lid and the tensioning bow. By closing the rear trunk lid, the engagement device preferably pivots upwardly into a position that tensions the folding convertible top. This engagement device may preferably include a catch hook affixed to the tensioning bow and a corresponding catch bracket preferably affixed to the rear trunk lid. Preferably, the catch hook is grasped by the catch bracket when closing the rear trunk lid.

Further, the rear trunk lid and the tensioning bow preferably are approximately co-axially supported relative to the vehicle.

In another aspect of the present teachings, the hinge device may be arranged between a rear trunk lid of a convertible vehicle and a tensioning bow for tensioning the rear side of a folding convertible top of the convertible vehicle. The hinge device preferably raises the rear side of the tensioning bow, which is pivotably supported on the vehicle, by opening the rear trunk lid that is pivotably supported on the vehicle.

In further preferred embodiments of this aspect of the present teachings, the hinge device is preferably constructed such that the rear side of the tensioning bow is raised initially slightly and then more significantly when the rear trunk lid is opened.

The hinge device may preferably include a coupling device that releases the hinge device between the rear trunk lid and the tensioning bow when the folding convertible top is opened and the tensioning bow is thereby lowered. In addition or in the alternative, the hinge device may include a first pivot lever supported relative to the vehicle, which first pivot lever is connected via a hinge with a second pivot lever supported relative to the vehicle. The coupling lever may be pivotably supported on the tensioning bow. In addition or in the alternative, the coupling lever may be pivotably connected with the first pivot lever.

Preferably, the respective positions of the pivot axis, the pivot levers and the coupling lever are defined such that a pivoting of the rear trunk lid from its closed position initially only leads to a small pivoting of the tensioning bow in the raising direction of the rear side and then to an increasing significant pivoting. For example, in this aspect, the first pivot lever may include two approximately right-angled bent arms, the longer end of which is connected with the second pivot lever on its free end and the shorter end of which is connected with the coupling lever on its free end. The pivot lever may be bearingly supported on the vehicle in the area between the arms. The bearing connection between the coupling lever and the tensioning bow may be disposed on the bearing connection of the first pivot lever, which side is opposed to the position of the bearing connection between the coupling lever and the first pivot lever, and is disposed nearly on a line that connects the locations of the bearing connection of the first pivot lever and the bearing connection of the coupling lever to the first pivot lever.

Preferably, the connection between the coupling lever and the first pivot lever is releasable when the rear trunk lid is closed by pivoting of the tensioning bow in the counter direction to the opening direction of the rear trunk lid. In this regard, the coupling lever may be pivoted by pivoting of the tensioning bow in the direction opposite to the opening direction of the rear trunk lid. A pin may be provided on the coupling lever, which pin preferably forms the bearing connection of the coupling lever on the first pivot lever, and may come out of engagement with a recess defined on the first pivoted lever.

Furthermore, a latching device may be provided that latches the engagement between the pin and the recess when the rear trunk lid is raised.

In addition or in the alternative to the various above-noted aspects, the tensioning bow may be supported on the vehicle via a lever that is supported on the vehicle.

According to the inventive vehicle, there exists wide freedom with respect to the design; when the forward side of the rear trunk lid overlays the tensioning bow in its closed state, an elegant body structure of the closed convertible vehicle is achieved. The convertible top can be advantageously lowered, as a whole, to a level of, or underneath, the front side of the rear trunk lid.

The invention will be elucidated in the following with the help of exemplary schematic drawings and with further details.

DETAILED DESCRIPTION OF THE INVENTION

In the following, the term "front" will be used for designating the forward direction of a convertible vehicle and the term "rear" will be used for designating the rearward direction of the vehicle; the lateral directions are the directions traverse to the vertical vehicle longitudinal midplane.

Figure 1:
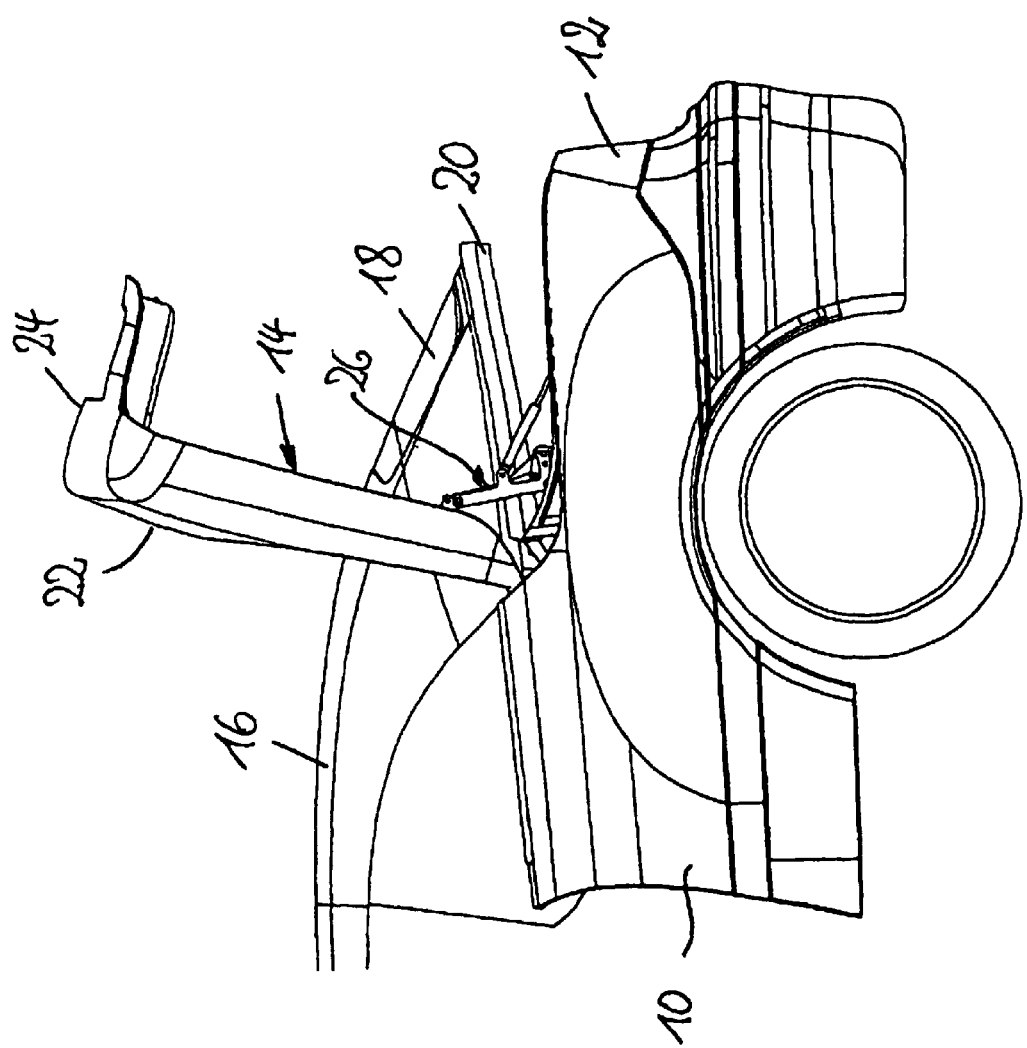
FIG. 1 a side view of the rear half of a conventional convertible vehicle for clarifying the problem underlying the invention, FIG. 2 a side view of an inventive convertible vehicle, FIG. 3 a side view of the inventive vehicle with removed outer shell, partly in section, and a closed rear trunk lid as well as a closed convertible top, FIG. 4 a view similar to FIG. 3 with a partly opened rear trunk lid, FIG. 5 a view similar to FIG. 3 with a fully opened rear trunk lid, FIG. 6 a view similar to FIG. 3 with a tensioning bow lowered due to the opened convertible top, FIG. 7 a detail of the inventive hinge device, FIG. 8 a side view, partly in section, of the rear half of a further embodiment of an inventive convertible vehicle, FIG. 9 a view similar to FIG. 8 with a rear trunk lid opened towards the rear and an upwardly pivoted tensioning bow, FIG. 10 a view similar to FIG. 8 with a fully opened convertible top and a closed rear trunk lid, FIG. 11 a view similar to FIG. 8 with a raised tensioning bow and a rear trunk lid opened towards the front, FIG. 12 a view similar to FIG. 11 with a closed convertible top, and FIG. 13 a view similar to FIG. 8 with a rear trunk lid fully opened in the rearward direction and FIG. 14 a view of the vehicle according to FIG. 8 with the convertible top removed except for the tensioning bow.

According to FIG. 1, a convertible vehicle, of which the rear half is illustrated in side view, comprises a vehicle body having a rear side portion 10 and a rear closing portion 12, wherein a trunk space is closable by a rear trunk lid 14 that is laterally and hingedly supported on the vehicle structure.

The vehicle comprises a convertible top 16, which is closed in the illustrated state, and which comprises a preferably foldable rear window 18; its rear end is attached in a known manner to a tensioning bow 20, which is tensionable by a not-illustrated hand or motor-actuatable mechanism in a position, in which the convertible top is satisfactorily tensioned. As is apparent, the vehicle is constructed with a relatively short rear end, so that, in the area of the vehicle middle, the top side of the rear trunk lid 14, which is cut out corresponding to the tension bow 20, only slightly rearwardly extends beyond the tensioning bow and the trunk space will essentially be closed by the bent rear wall 24 of the rear trunk lid 14. So that the rear trunk lid 14 can be moved from a closed position, in which it clasps or overlays the tensioning bow 20 in a flush manner, into the illustrated opened position, a hinge mechanism 26 is provided in a known manner, and thus will not be further explained herein, by which means the rear trunk lid 22 is attached to the vehicle structure.

As is apparent, the loading capability of the trunk space is restricted by the wide rearwardly projecting tensioning bow 20.

Figure 2:
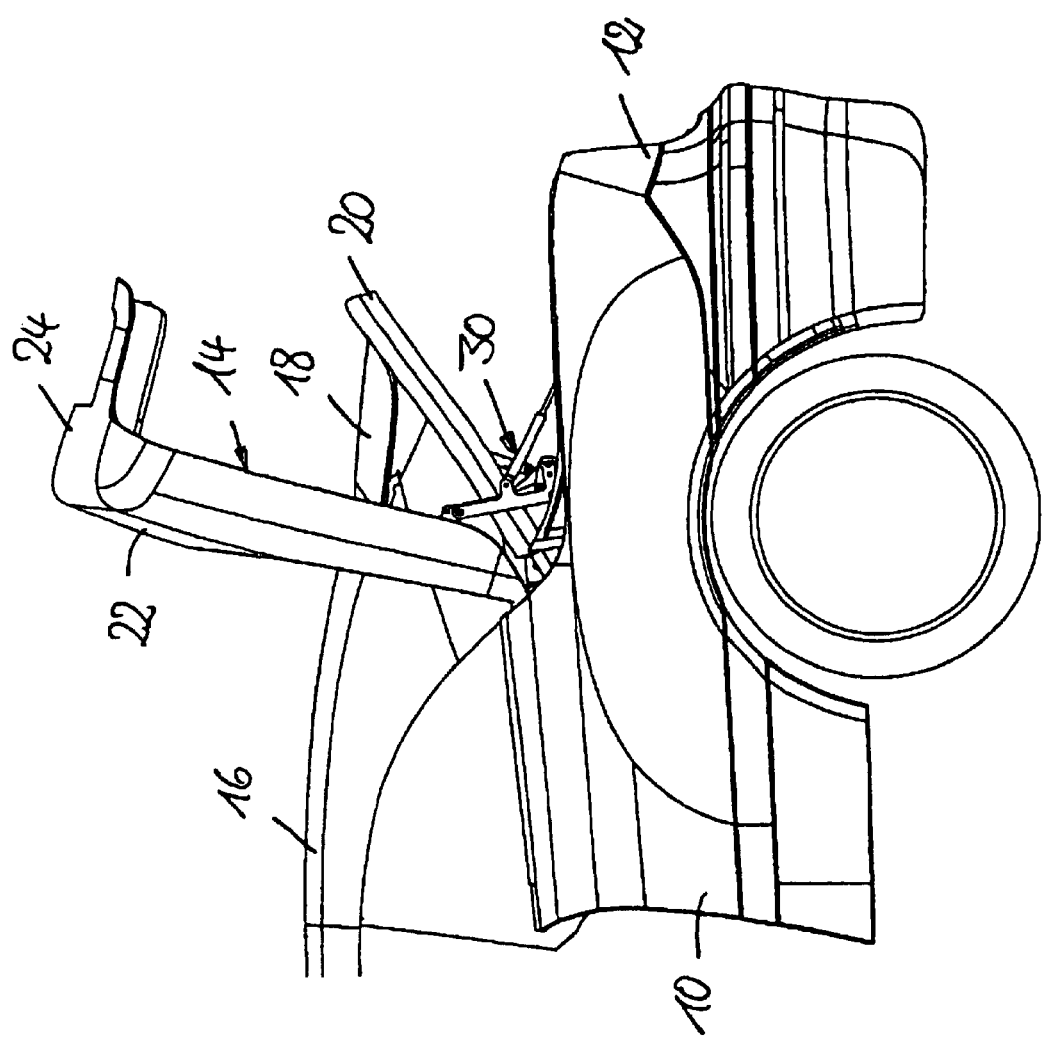

To remedy this problem, the vehicle is inventively constructed as shown in FIG. 2, wherein the same reference numbers will be used in FIG. 2 as in FIG. 1 for the corresponding components, as far as these are not again explained.

As is apparent from a comparison of FIG. 2 with FIG. 1, the two vehicles primarily differ in that the tensioning bow 20 of the inventive vehicle is upwardly pivoted, so that the loading capability of the trunk space is significantly less restricted. This is achieved by a hinge device 30, which will be more precisely explained in the following with the help of FIG. 3 to 7.

Figure 3:
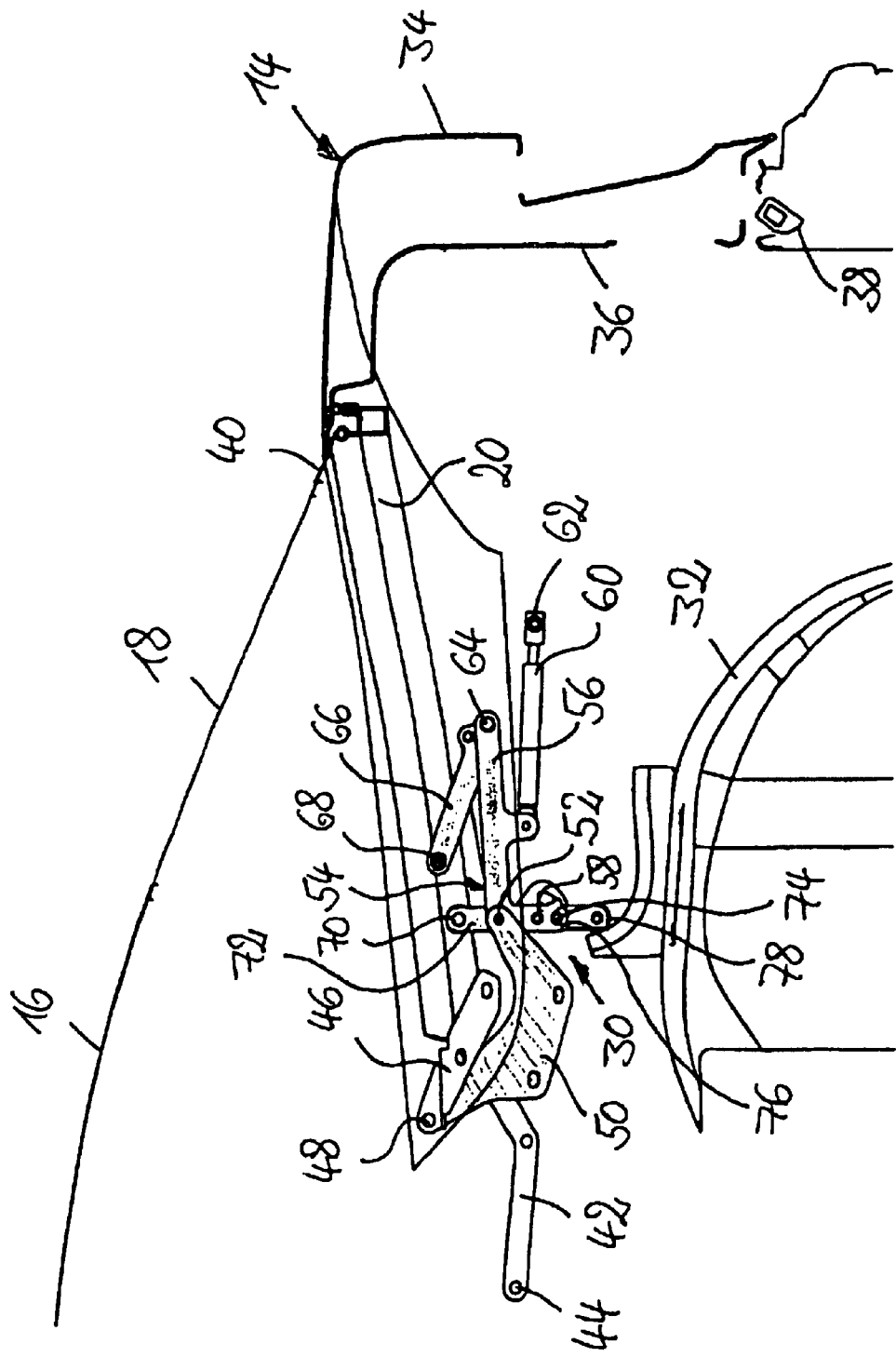

In FIG. 3, the hinge device 30 is shown provided on the left side of the vehicle with reference to the vehicle longitudinal direction. Another, not-illustrated hinge device 30 is provided on the right side of the vehicle. The left-side wheel arch 32 of the vehicle body is schematically represented in FIG. 3. Further, the rear trunk lid 14 is visible in section with outer plate 34 and inner plate 36. The bottom of the rear trunk lid rests on the rear closure support 38, which also forms the loading edge.

The lower, rear side 40 of the convertible top 16 is attached to the tensioning bow 20 in a known manner, which bow 20 is formed by a bow-shaped metal profile that is supported on a lever 42 at the two respective forward ends of the bow; the lever 42 is pivotably connected with the vehicle body at the hinge 44.

The rear trunk lid 14 is pivotably supported by respective hinges 48 at a bearing support 50 via reinforcement parts 46 integrated into the forward ends of the rear trunk lid 14, the bearing support 50 being affixed to the vehicle body.

Behind and underneath the hinge 48 with reference to the vehicle, an overall L-shaped first pivot lever 54 is supported on the bearing support 50 at another hinge 52, whose one arm 56 extends approximately level towards the rear in the illustrated closed state of the rear trunk lid 14 and whose other arm 58 projects downwardly approximately perpendicularly from the hinge 52, A pneumatic spring 60 is engaged with the arm 56 approximately in the middle thereof; the pneumatic spring 60 is supported in a manner affixed to the vehicle body.

A second pivot lever 66 is pivotably supported on the free end of the arm 56 at the hinge 64; the second pivot lever 66 is inclined upwardly and forwardly in the illustrated offset position and is pivotably connected with the rear trunk lid 14 at the hinge 68 (not portrayed in detail in FIG. 3).

For connecting said components with the tensioning bow 20, a coupling lever 72 is pivotably supported on the tensioning bow 20 in the illustrated position somewhat above the hinge 52 at the hinge 70; with a pin 74, the lever 72 projects into a recess 76 that is formed on the free end of the arm 58 of the first pivot lever 54. The pin 74 forms a hinge axis, about which the coupling lever 72 is pivotable relative to the first pivot lever 54.

The coupling lever 72 extends beyond the pin 54 and, on its free end, carries a roller 78 for contacting a guide surface 80 that is connected to the vehicle body. The function of the roller 78 and the guide surface 80 will be further explained below with the help of FIG. 7.

Figure 4:
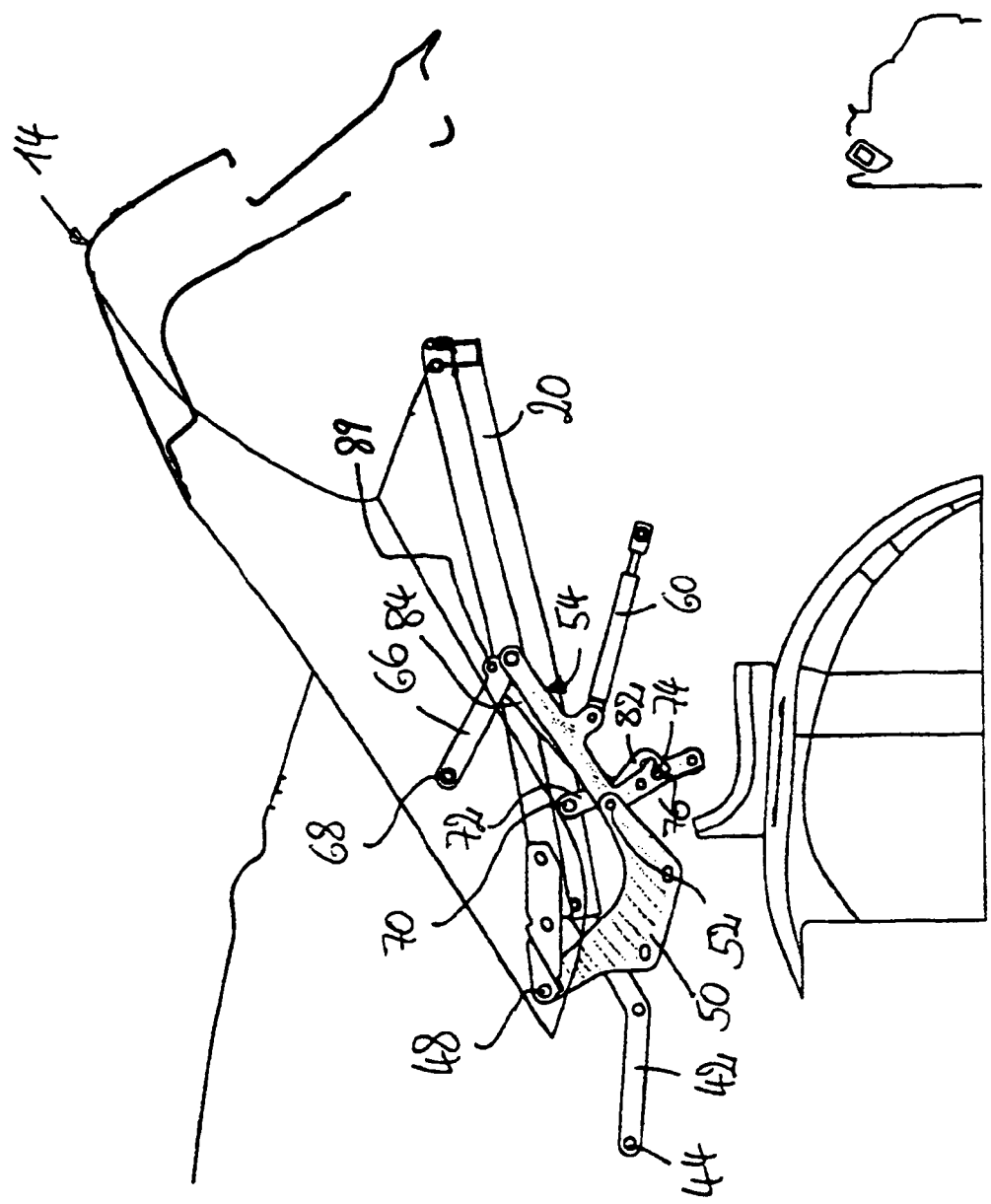

The function of the previously described components and hinge device is the following:

As shown in FIG. 4, when the rear trunk lid 14 is upwardly pivoted about the hinge 48, the hinge 68 is accordingly upwardly pivoted together with the rear trunk lid 14, wherein the angle between the second pivot lever 66 and the first pivot lever 54 increases and the first pivot lever 54 is pivoted about the hinge 52 in the counter-clockwise direction. As a result, the pin 74, which forms the hinged connection between the first pivot lever 54 and the coupling lever 72, initially moves along a circular arc underneath the hinge 70, so that the hinge 70 and thereby the tensioning bow 20 are initially barely raised; i.e. an initially large pivot angle of the rear trunk lid 14 is converted into a small pivot angle of the tensioning bow 20, so that the high tension force that acts upon the convertible top 16 is dissipated slowly and without an overly large torsion loading on the opening movement of the rear trunk lid 14. During this initial phase of the opening of the rear trunk lid 14, a latching lever 82 is pivoted further downwardly according to the above-described manner, such that the latching lever 82 latches the pin 74 in the recess 76, so that the pin 74 does not come clear from the recess when the tension on the convertible top is decreased.

By further opening the rear trunk lid 14 (FIG. 5), its opening movement will convert into a pronounced pivoting of the tensioning bow 20 in the counter-clockwise direction due to the migration of the arm 58 radial to the hinge 70; therefore, when the rear trunk lid 14 is fully opened, the tensioning bow 20 is noticeably raised and the opening dimension L206, i.e. the distance between the tensioning bow 20 and the loading edge formed by the rear closure support 38, is enlarged by a comfortable amount.

While the opening of the rear trunk lid is initially facilitated by the decreasing tension on the convertible top, the further opening of the rear trunk lid is then facilitated by the pneumatic spring 60, which reliably holds the rear trunk lid it its open position.

When closing the rear trunk lid, the described procedures are performed in the reverse order, wherein the convertible top is reliably tensioned again in the last phase of the closing of the rear trunk lid.

When the convertible top 16 is opened, it is stowed in the space in front of the forward side of the rear trunk lid 14, wherein the lever 42 is pivoted by lowering of the tensioning bow 20 in the clockwise direction and the convertible top is accommodated by filling the space between the tensioning bow 20 and the recess of the top side of the rear trunk lid 14, which recess normally encompasses the tensioning bow 20. By opening the rear trunk lid 14 in this opened and/or folded-together state of the convertible top 16, it is prohibited, for reasons of possible damage to the convertible top, that the tensioning bow 20 is raised by opening the rear trunk lid 14. So that this does not happen, the coupling lever 72 is moved by lowering of the tensioning bow 20 into its lowered, folding-top-accommodating position in a decoupled position, in which the hinged connection between the pin 70 of the coupling lever 72 and the first pivot lever 54 is released.

The decoupling procedure will be explained with the help of FIG. 7.

When the tensioning bow 20 is lowered, the roller 78, which is supported on the free end of the coupling lever 72, arrives in abutment with the guide surface 80 that is formed on a connecting member affixed to the vehicle body. By further lowering the coupling lever 72, the pin 74 reaches out of the recess 76 on the free end of the arm 58, which recess is preferably constructed with a cant 83 as shown in FIG. 7; therefore, the pin 74 will come free from the recess 76 and thereby from the first pivot lever 54 and move into the position shown in FIG. 6 by further lowering the tensioning bow 20. In this position, the first pivot lever 54 is completely decoupled from the coupling lever 72, so that the rear trunk lid 14 can be opened without the tensioning bow 20 somehow being moved therewith.

Figure 5:
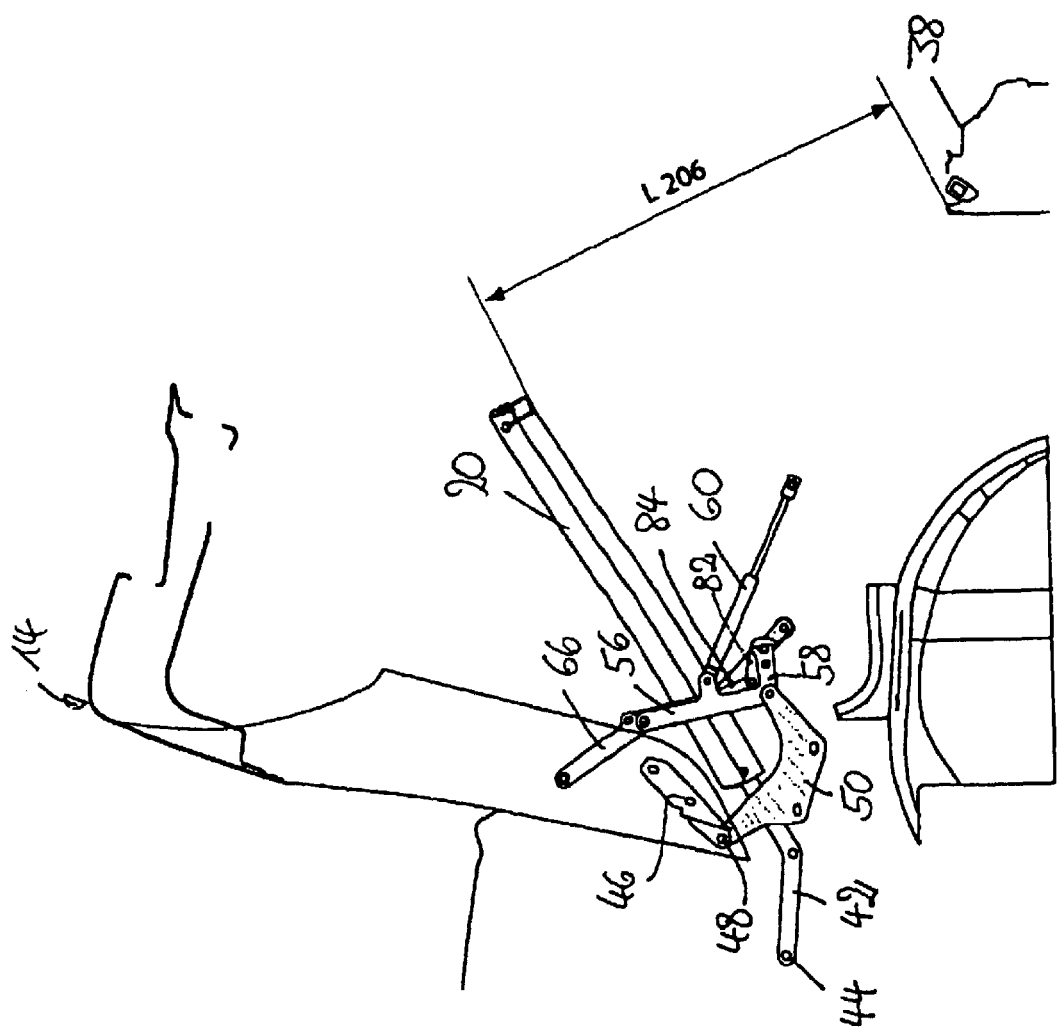
Figure 6:
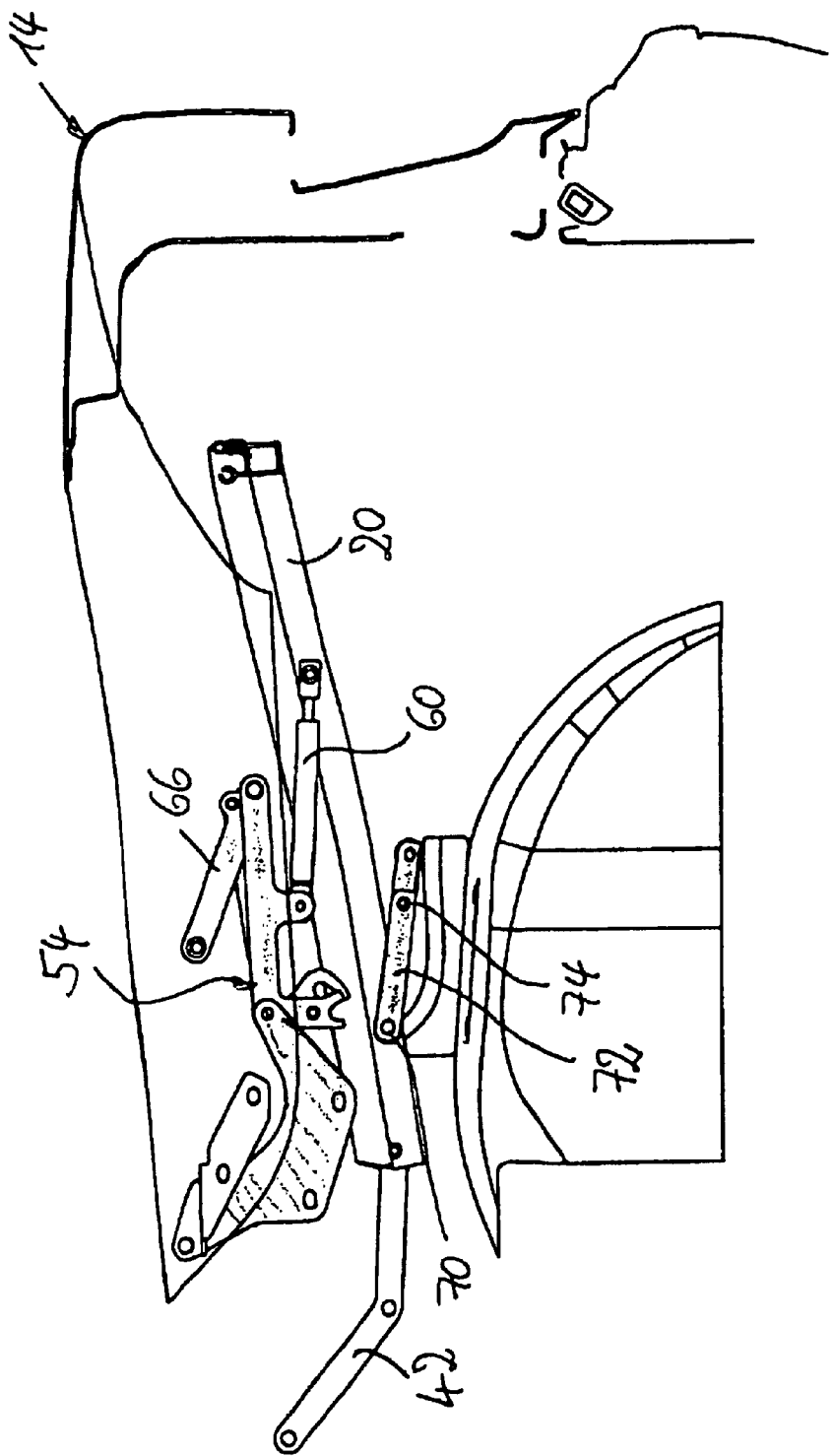
Figure 7:
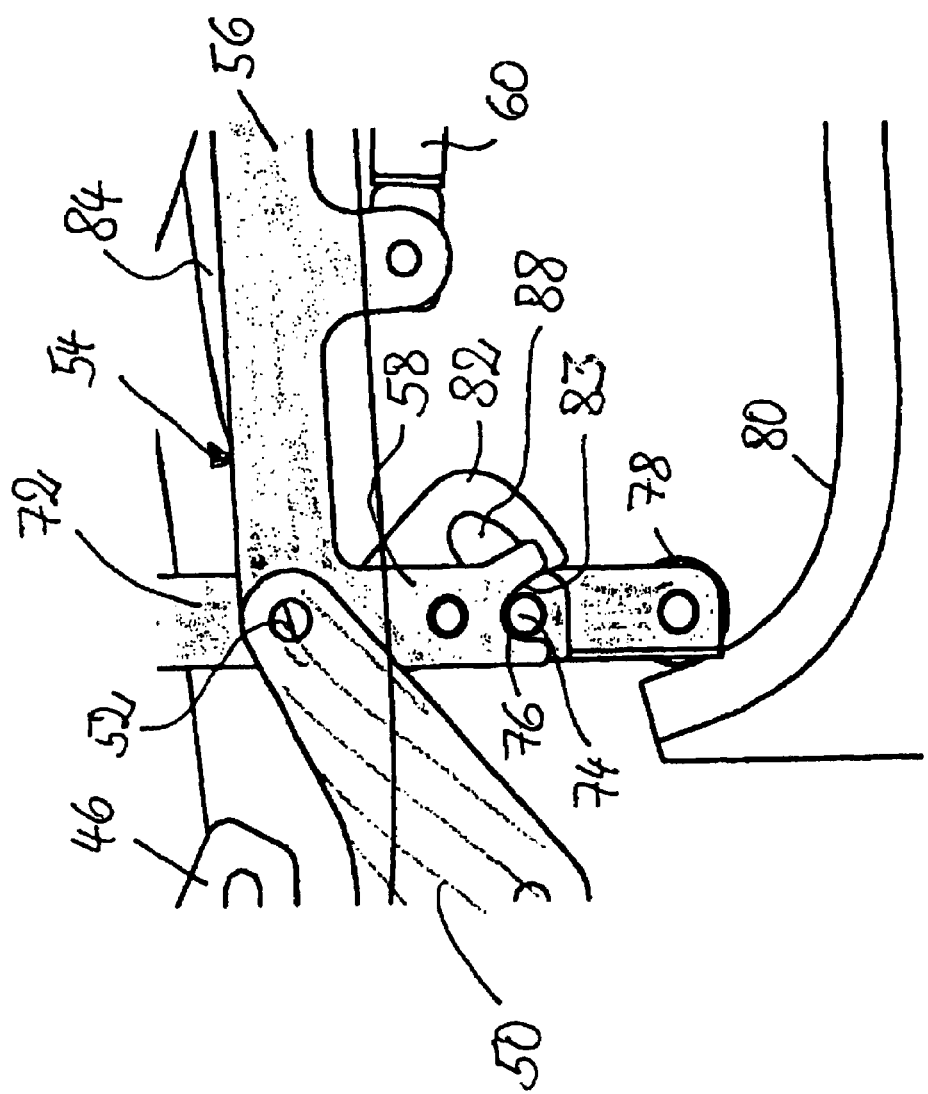

When the rear trunk lid 14 is closed as shown in FIG. 7, the latch lever 82, which is clearly visible in FIG. 7, is pivoted into a position, in which the movability of the pin 74 out from the recess 76 is released. Thus, this will result in that the latch lever 82 is hinged on the arm 58 and is hinged at its other end (visible in FIG. 5) to an operation lever 84, which is hinged at hinge connection 89 with the second pivot lever 66 (FIG. 4 and 5). When the two pivot levers 54 and 66 are pivoted from their maximum folded position shown in FIG. 3 by opening the rear trunk lid 14, the latch lever 82 is pivoted in the clockwise direction, so that the lower side of a recess 88, which is formed on the side end of latch lever 82, catches the pin 74 and latches the pin 74 in the recess 76.

The described embodiment of the hinge device can be modified in many ways. For example, when the rear trunk is fully closed and the convertible top 16 is closed, the coupling lever 72 can take an "over" dead center position with respect to the hinge 52, so that the tension of the convertible top contributes to its closing during the very last closing phase of the rear trunk lid and respectively this tension does not immediately pull in the opening position when the rear trunk lid is opened. The simple hinge 48, with which the rear trunk lid is supported on the vehicle body, can be replaced with a multi-lever or 4-bar linkage. The lever mechanisms can be replaced by other lever mechanisms having a corresponding object, with which a functional hinge device is created, by which the tensioning bow also will opened by opening of the rear trunk lid, when the convertible top is closed. When the convertible top is opened, the rear trunk lid is openable without a movement or pivoting of the tensioning bow.

A further embodiment of an inventive convertible vehicle will be described in the following with the assistance of FIGS. 8 to 14. The same reference numerals will be utilized for functionally-similar components as the embodiment according to FIGS. 1 to 7.

Figure 8:
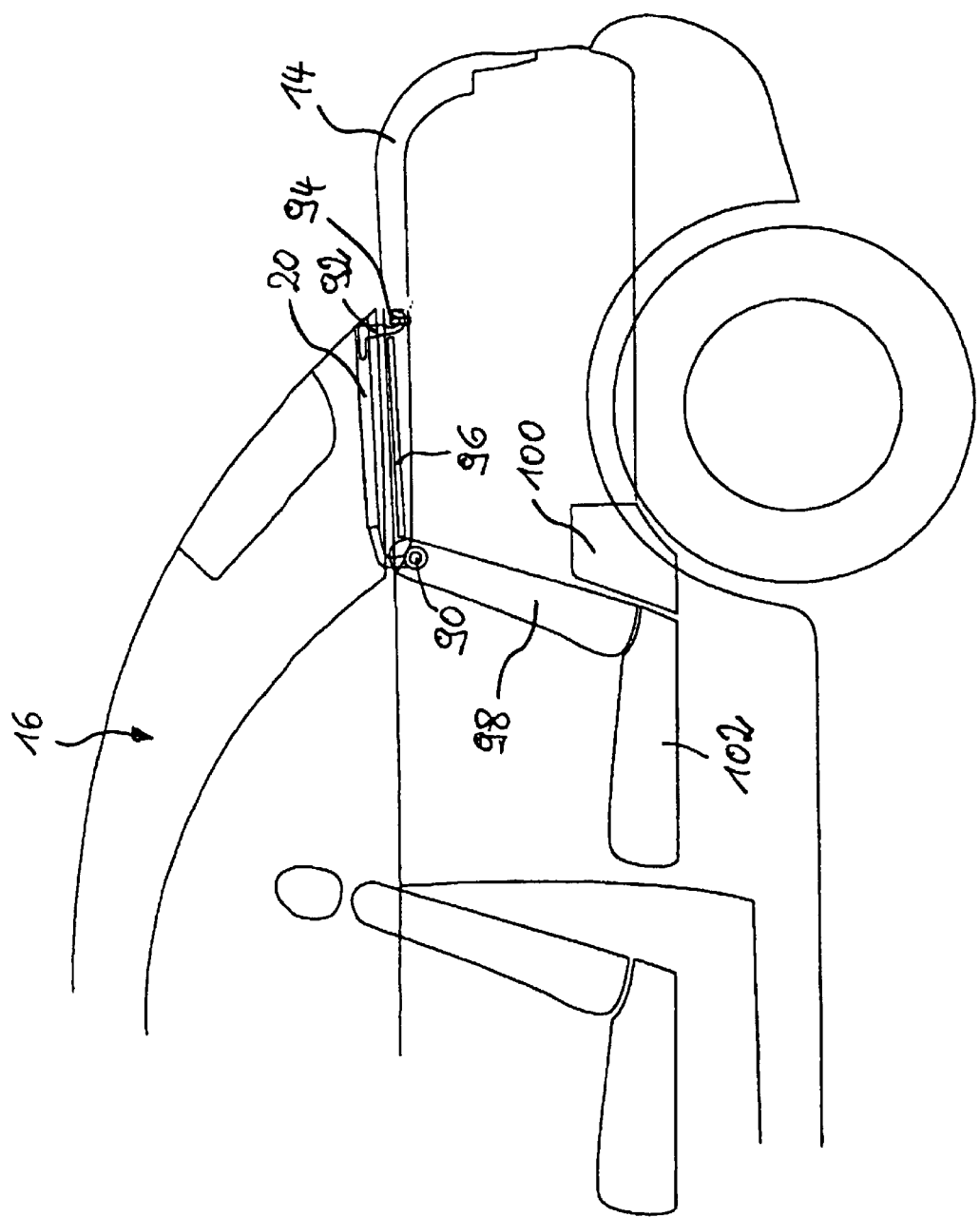

According to FIG. 8, for the convertible vehicle of the second embodiment, the rear lid 14, which is cut out in its forward area corresponding to the tensioning bow 20, is pivotably supported by a 4-bar linkage (not shown) on both sides in manner affixed to the vehicle body. The tensioning bow 20 is pivotably supported about an axis 90 on both sides of the vehicle body in a similar way. At least one downwardly projecting catch hook 92 is affixed to the tensioning bow 20; when the rear trunk lid 14 is downwardly pivoted, the hook 92 engages a corresponding catch bracket 94 affixed to the forward side of the rear trunk lid 14; the catch bracket 94 downwardly pivots the tensioning bow in the clockwise direction when the rear trunk lid 14 is being closed and thereby tensions the convertible top 16.

A plate- and/or tray-shaped hat rack is designated by 96, which is fit, for example, in the interior lining behind a back rest 98 of a rear seat of the vehicle. A fuel tank 100 can be arranged even with and behind the rear seat back rest 102 and preferably in front of the not-illustrated rear axis of the vehicle.

In the illustrated example, the tensioning bow 20 spans the entire U-shaped formed forward side of the rear trunk lid 14, which side corresponds to the tensioning bow 20, against which the tensioning bow 20 will press in sealing abutment following the engagement between the catch bracket 94 and the catch hook 92, which component will be provided by not-illustrated gaskets.

Figure 9:
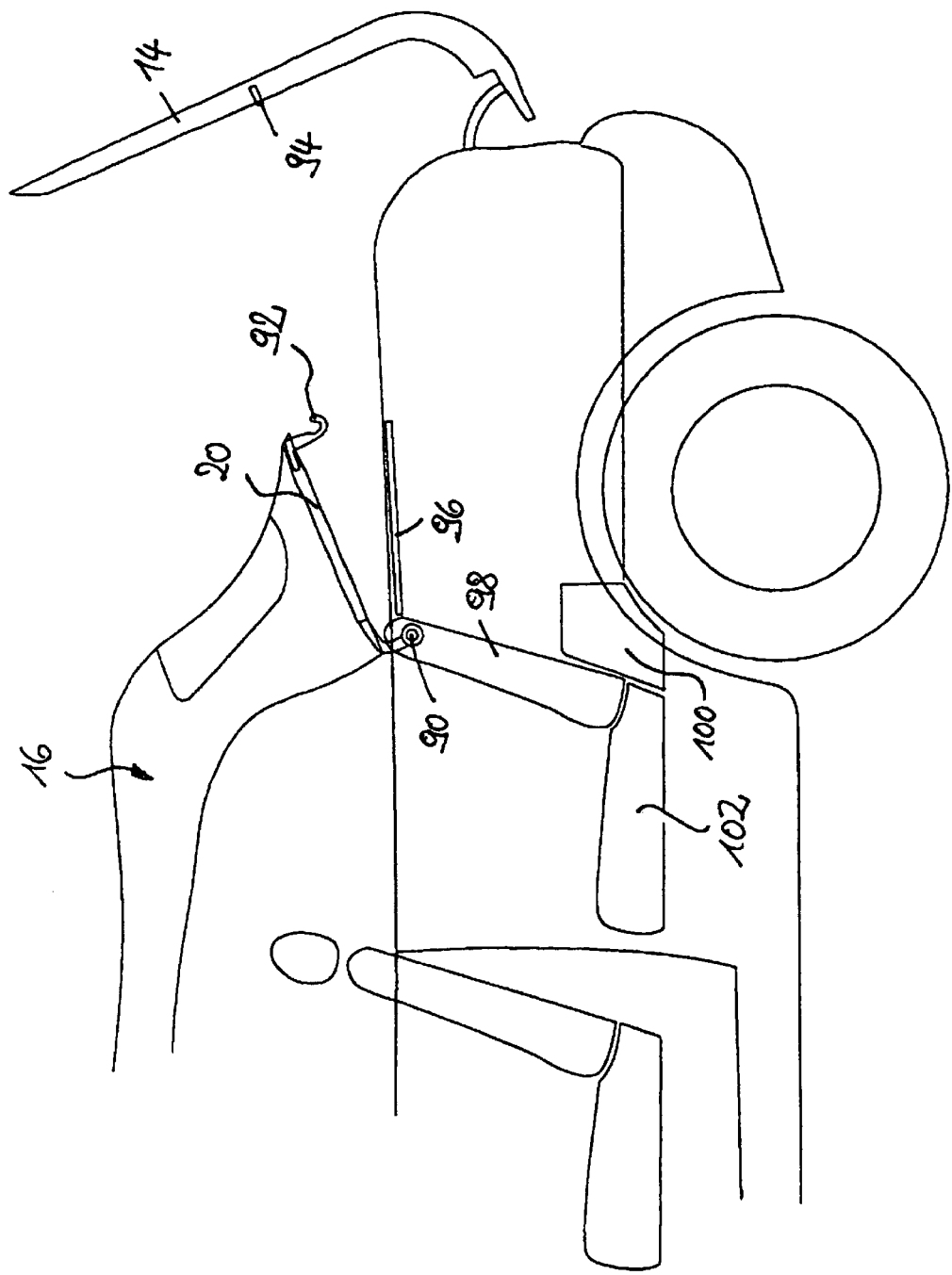

FIG. 9 shows the arrangement according to FIG. 8 when the tensioning bow 20 has been pivoted in the counter-clockwise direction and the rear trunk lid 14 has been pivoted in the clockwise-direction via a bearing in its rear area.

A hinged connection of the rear trunk 14 to the vehicle body is already known such that the rear trunk lid 14 is pivotable, on the one hand shown in FIG. 9, in the clockwise direction about a bearing in its rearward area and is pivotable in the counter-clockwise direction about the bearing in its forward area (FIG. 1), and thus will not be explained.

Figure 10:
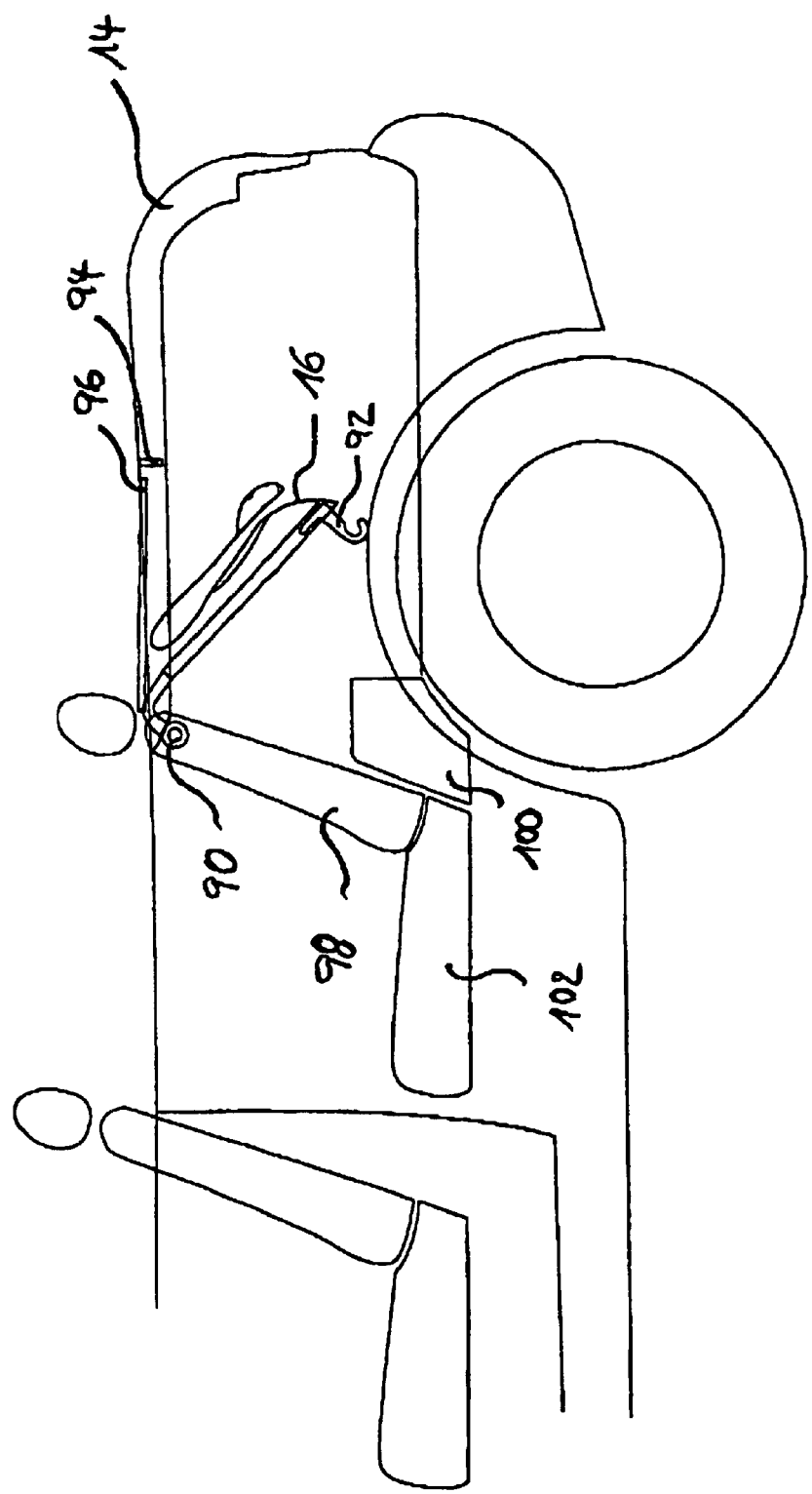

In the illustrated example, the pivotability of the rear trunk lid into the position shown in FIG. 9 is necessary, so that the convertible top 16, which comprises relatively long linkage parts that are not illustrated in detail, can be moved into its fully opened position shown in FIG. 10.

For opening the convertible top 16, the rear trunk lid 14 is initially pivoted into the position shown in FIG. 9, wherein the catch bracket 94 comes out of the engagement with the catch hook 92, so that the tensioning bow 20 pivots in the counter-clockwise direction, e.g., due to the tension of the folding top. The convertible top 16 will then be opened in a known manner, wherein the lateral linkage parts move under the vehicle waist line in the rear area. The hat rack 96 can be brought into the illustrated lowered position shown in FIG. 10 by means of a mechanism.

Figure 11:
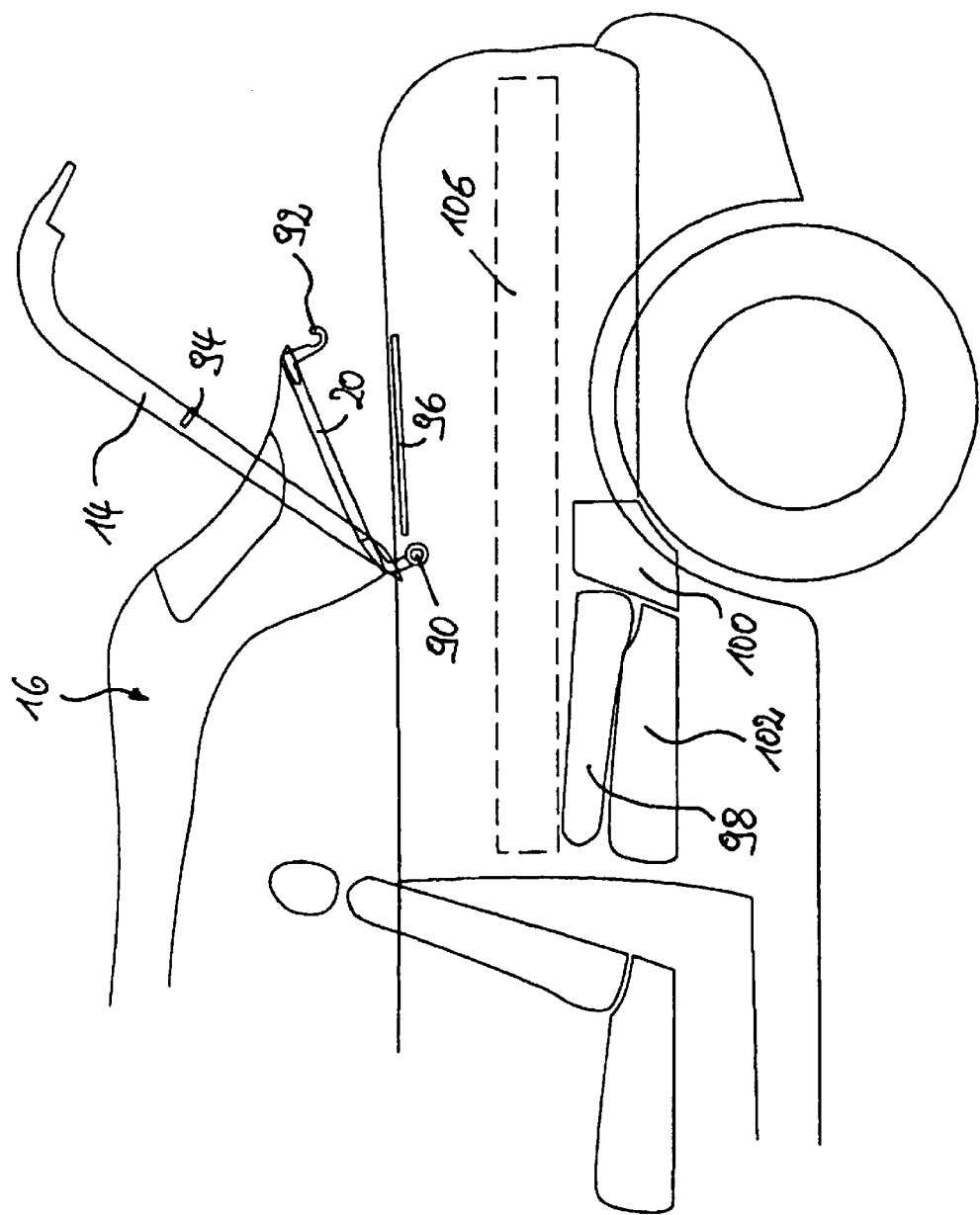

FIG. 11 shows a operational state, in which the back rest 98 is folded onto the seat rest 1002, so that the upwardly facing rear side of the back rest 98 and the upper side of the tank 100 form an approximately level surface, on which surface a voluminous luggage piece 106 can be stowed in the luggage compartment that extends into the interior space of the vehicle.

It is understood that the hat rack 96, which obstructs the loading of luggage in the position shown in FIG. 11 and in which the tensioning bow 20 is pivoted in the counter-clockwise direction, can be removed, or the hat rack 96 can be constructed such that it is fit in the tensioning bow 20, so that it raises together with the tensioning bow 20. When the rear trunk lid 14 is closed from the position shown in FIG. 11, the catch bracket 94 again comes into engagement with the catch hook 92, so that the tensioning bow 20 is pivoted downwards under the tension of the folding top.

Figure 12:
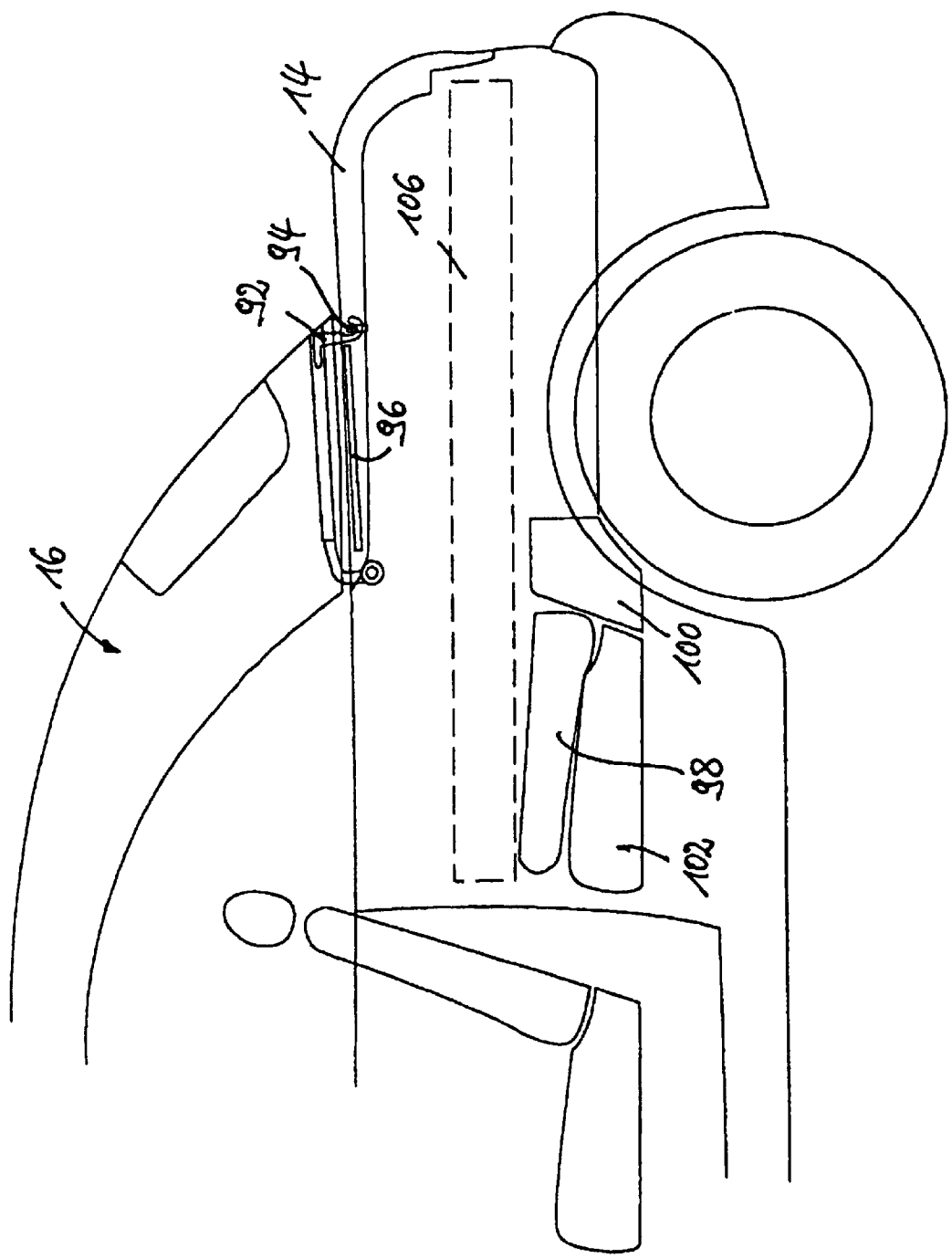

FIG. 12 shows the position reached from the position shown in FIG. 11 when the rear trunk lid 14 is fully closed.

FIG. 13 shows an operational state of the vehicle corresponding to FIG. 11, wherein the rear trunk lid 14 is however pivoted in the clockwise direction, so that the folding top 16 can be brought into the position shown in FIG. 10 and can be fully opened. In this way, a luggage compartment that reaches into the vehicle interior space can be constructed, in which flat and very long objects can be accommodated.

FIG. 14 shows a view of the vehicle in the state of FIG. 12, wherein the folding top, with the exception of the tensioning bow 20, is not illustrated.

As is apparent, a traverse-loading dimension D is possible by suitable construction of the rear portion of the vehicle without a structural rear wall behind the back rest(s) 98, but rather, e.g., with a cross-beam remaining underneath the upper side of the tank. The cross-beam forms laterally projecting consoles 110, and the bearings of the rear trunk lip and the tensioning bow are affixed on the cross-beam; the traverse-loading dimension D is defined by the distance between the consoles 110. The consoles 110 advantageously include recesses 112 for a rigid, or extendible in a known manner in the case of a dangerous situation, roll bar 114 (not illustrated in the other figures), which by this means does not oppose traverse loading.

As is further apparent from FIG. 14, two or more catch hooks 92 and catch brackets 94 are advantageously provided.

With the described embodiment, a large luggage loading opening, as well as a high traverse loading breadth, is made possible. The hat rack 96 can be, e.g., completely removable, so that a maximal loading capacity is available when the folding top is closed in combination with turned-down rear seat backs. The hat rack 96 can be, e.g. moved by hand or by motor from its raised position to its lowered position, wherein the lowered position can be detected by a sensor, which sensor indicates a free space for the storage of the convertible top. This is particularly advantageous for motorized actuation of the convertible top.

The described movements of the tensioning bow, the convertible top, the rear trunk lid and, if necessary, the hat rack can take place by purely manually operation. By the engagement between the rear trunk lid 14 and the tensioning bow 20 with assistance of the engagement device, i.e. the catch hook and catch bracket in the illustrated example, a separate movement of the tensioning bow 20 into the end position that tensions the convertible top is not required, rather, the end movement takes place directly by the closing of the rear trunk lid 14. The axes, about which the rear trunk lid and/or the tensioning bow move, can be kinematically supported by corresponding multi-link hinges, so that a more secure engagement between the catch hook 92 and the catch bracket 94 is ensured, even if the tensioning bow 20 is still located in a position noticeably pivoted vis-à-vis its rest position. Furthermore, actuators can be provided for the pivoting of the tensioning bow 20, the rear trunk lid 14 and, if necessary, for the movement of the hat rack 96 and/or the folding-over of the back rests 98, the actuators can be controlled in a coordinated manner by a control device.

The features of the exemplary-described embodiments can be modified, provided the respective desired goal is fulfilled, and combined with each other in various ways. For example, an engagement mechanism with catch hooks and catch brackets can be provided for the first-described embodiment. For the second-identified embodiment, the tensioning bow and the rear trunk lid can be constructed such that the rear trunk lid 14 overlaps the tensioning bow 20 from behind and above, which results in a particularly elegant appearance of the vehicle.

REFERENCE NUMBER LIST

10 Side Part
12 Rear Closure Part
14 Rear Trunk Lid
16 Convertible Top
18 Rear Window
20 Tensioning Bow
22 Upper Side
24 Rear Wall
26 Hinge Mechanism
30 Hinge Device
32 Wheel Arch
34 Outer Plate
36 Inner Plate
38 Rear Closure Support
40 Side
42 Lever
44 Hinge
46 Reinforcement Part
48 Hinge
50 Bearing Support
52 Hinge
54 Pivot Lever
56 Arm
58 Arm
60 Pneumatic Spring
62 Bearing
64 Hinge
66 Pivot Lever
68 Hinge
70 Hinge
72 Coupling Lever
74 Pin
76 Recess
78 Roller
80 Guide Surface
82 Latching Lever
84 Operation Lever
86 Hinge
88 Recess
90 Axis
92 Catch Hook
94 Catch Bracket
96 Hat Rack
98 Back Rest
100 Fuel Tank
102 Seat Rest
106 Luggage Piece
108 Cross-Beam
110 Console
112 Receptacle
114 Roll Bar

The invention claimed is:

1. A convertible vehicle comprising:
a vehicle body having a pair of lateral sides,
a folding convertible top,
a tensioning bow coupled to a rear side of the folding convertible top and pivotably supported on both lateral sides of the vehicle body by tensioning bow pivots, and
a rear trunk lid pivotably supported on both lateral sides of the vehicle body by trunk lid pivots, the trunk lid pivots being separate from the tensioning bow pivots, wherein a front side of the rear trunk lid is disposed in the vicinity of the tensioning bow when the rear trunk lid is in a closed position and a loading opening of a luggage compartment is disposed underneath the rear trunk lid and underneath the tensioning bow at least when the folding convertible top is closed, and
wherein the tensioning bow is movable into an upwardly pivoted position during opening of the rear trunk lid or when the rear trunk lid is opened, so that the loading opening is enlarged.

2. A convertible vehicle according to claim 1, further comprising a hinge device arranged between the rear trunk lid and the tensioning bow, wherein the hinge device is arranged and constructed to upwardly pivot the tensioning bow when the rear trunk lid is being opened.

3. A convertible vehicle according to claim 1, wherein the rear trunk lid and the tensioning bow are approximately co-axially supported relative to the vehicle body.

4. A convertible vehicle comprising:
a vehicle body having a pair of lateral sides,
a folding convertible top,
a tensioning bow coupled to a rear side of the folding convertible top and pivotably supported on both lateral sides of the vehicle body, and
a rear trunk lid pivotably supported on both lateral sides of the vehicle body, wherein a front side of the rear trunk lid is disposed in the vicinity of the tensioning bow when the rear trunk lid is in a closed position and a loading opening of a luggage compartment is disposed underneath the rear trunk lid and underneath the tensioning bow at least when the folding convertible top is closed, and
wherein the tensioning bow is movable into an upwardly pivoted position during opening of the rear trunk lid or when the rear trunk lid is opened, so that the loading opening is enlarged,
wherein the tensioning bow is pivotable independent of a pivoting of the rear trunk lid when the rear trunk lid is being opened.

5. A convertible vehicle according to claim 4, further comprising an engagement device that is operative between the front side of the rear trunk lid and the tensioning bow, wherein the engagement device is arranged and constructed to pivot upwardly into a position that tensions the folding convertible top when the rear trunk lid is closed.

6. A convertible vehicle according to claim 5, wherein the engagement device includes a catch hook affixed to the tensioning bow and further comprising a catch bracket affixed to the rear trunk lid, wherein the catch hook is arranged and constructed to be grasped by the catch bracket when the rear trunk lid is closed.

7. A convertible vehicle according to claim 6, wherein the rear trunk lid and the tensioning bow are approximately co-axially supported relative to the vehicle body.

8. A convertible vehicle comprising:
a vehicle body having a pair of lateral sides,
a folding convertible top,
a tensioning bow coupled to a rear side of the folding convertible top and pivotably supported on both lateral sides of the vehicle body, and
a rear trunk lid pivotably supported on both lateral sides of the vehicle body, wherein a front side of the rear trunk lid is disposed in the vicinity of the tensioning bow when the rear trunk lid is in a closed position and a loading opening of a luggage compartment is disposed underneath the rear trunk lid and underneath the tensioning bow at least when the folding convertible top is closed, and wherein the tensioning bow is movable into an upwardly pivoted position during opening of the rear trunk lid or when the rear trunk lid is opened, so that the loading opening is enlarged, further comprising an engagement device that is operative between the front side of the rear trunk lid and the tensioning bow, wherein the engagement device is arranged and constructed to pivot upwardly into a position that tensions the folding convertible top when the rear trunk lid is closed.

9. A convertible vehicle according to claim 8, wherein the engagement device includes a catch hook affixed to the tensioning bow and further comprising a catch bracket affixed to the rear trunk lid, wherein the catch hook is arranged and constructed to be grasped by the catch bracket when the rear trunk lid is closed.

10. A convertible vehicle comprising:
a vehicle body having a pair of lateral sides,
a folding convertible top,
a tensioning bow coupled to a rear side of the folding convertible top and pivotably supported on both lateral sides of the vehicle body, and
a rear trunk lid pivotably supported on both lateral sides of the vehicle body, wherein a front side of the rear trunk lid is disposed in the vicinity of the tensioning bow when the rear trunk lid is in a closed position and a loading opening of a luggage compartment is disposed underneath the rear trunk lid and underneath the tensioning bow at least when the folding convertible top is closed, and wherein the tensioning bow is movable into an upwardly pivoted position during opening of the rear trunk lid or when the rear trunk lid is opened, so that the loading opening is enlarged, further comprising a hinge device arranged between the rear trunk lid and the tensioning bow, wherein the hinge device is arranged and constructed to upwardly pivot the tensioning bow when the rear trunk lid is being opened, wherein the hinge device is arranged and constructed such that, when the rear trunk lid is being opened, the rear side of the tensioning bow is first raised only slightly and then is raised more considerably as the rear trunk lid is further opened.

11. A convertible vehicle according to claim 10, wherein the hinge device includes a coupling device arranged and constructed to release the hinge device when the folding convertible top is opened and the tensioning bow is thereby lowered.

12. A convertible vehicle according to claim 11, wherein the hinge device includes:
a first pivot lever,
a second pivot lever connected to the first pivot lever via a hinge and
a coupling lever pivotably supported on the tensioning bow, the coupling lever being pivotable relative to and connectable with the first pivot lever.

13. A convertible vehicle according to claim 12, wherein a pivot axis, the first and second pivot levers and the coupling lever are positioned and constructed such that pivoting the rear trunk lid from the closed position initially only leads to a relatively small pivoting of the tensioning bow in a raising direction of the rear side of the rear trunk lid and then leads to an increasingly larger pivoting as the rear trunk lid is further raised.

14. A convertible vehicle according to claim 13, wherein the first pivot lever includes a longer arm and a shorter arm arranged substantially perpendicular to each other, wherein the longer arm is connected with a terminal end of the second pivot lever and the shorter arm is connectable with a free end of the coupling lever,
wherein the first pivot lever is pivotably connected to the vehicle body at a portion between said arms and
wherein a first bearing connection between the coupling lever and the tensioning bow is disposed substantially on a line that connects said portion between the arms and a second bearing connection between the coupling lever and the first pivot lever when the rear trunk lid is in the closed position.

15. A convertible vehicle according to claim 14, wherein the second bearing connection between the coupling lever and the first pivot lever when the rear trunk lid is closed is releasable by pivoting the tensioning bow in a counter direction to the opening direction of the rear trunk lid.

16. A convertible vehicle according to claim 15, wherein the coupling lever is arranged and constructed to be pivoted by pivoting of the tensioning bow in the direction opposite to the opening direction of the rear trunk lid and a pin provided on the coupling lever, the pin forming the second bearing connection between the coupling lever on the first pivot lever, is arranged and constructed to come out of engagement with a recess defined on the first pivot lever.

17. A convertible vehicle according to claim 16, further comprising a latching device arranged and constructed to latch the engagement between the pin and the recess when the rear trunk lid is raised.

18. A convertible vehicle according to claim 17, wherein the tensioning bow is supported on the vehicle body via a lever supported on the vehicle body.

19. A convertible vehicle according to claim 18, further comprising an engagement device that is operative between the front side of the rear trunk lid and the tensioning bow, wherein the engagement device is arranged and constructed to pivot upwardly into a position that tensions the folding convertible top when the rear trunk lid is closed.

20. A convertible vehicle according to claim 19, wherein the engagement device includes a catch hook affixed to the tensioning bow and further comprising a catch bracket affixed to the rear trunk lid, wherein the catch hook is arranged and constructed to be grasped by the catch bracket when the rear trunk lid is closed.

21. A convertible vehicle according to claim 12, wherein the connection between the coupling lever and the first pivot lever is releasable when the rear trunk lid is closed by pivoting of the tensioning bow in a counter direction to the opening direction of the rear trunk lid.

22. A convertible vehicle according to claim 21, wherein the coupling lever is arranged and constructed to be pivoted by pivoting of the tensioning bow in the direction opposite to the opening direction of the rear trunk lid and a pin provided on the coupling lever, the pin connecting the coupling lever with the first pivot lever, is arranged and constructed to come out of engagement with a recess defined on the first pivot lever.

23. A convertible vehicle according to claim 22, further comprising a latching device arranged and constructed to latch the engagement between the pin and the recess when the rear trunk lid is raised.

24. A convertible vehicle comprising:
a vehicle body having a pair of lateral sides,
a folding convertible top, a tensioning bow coupled to a rear side of the folding convertible top and pivotably supported on both lateral sides of the vehicle body, and a rear trunk lid pivotably supported on both lateral sides of the vehicle body, wherein a front side of the rear trunk lid is disposed in the vicinity of the tensioning bow when the rear trunk lid is in a closed position and a loading opening of a luggage compartment is disposed underneath the rear trunk lid and underneath the tensioning bow at least when the folding convertible top is closed, and wherein the tensioning bow is movable into an upwardly pivoted position during opening of the rear trunk lid or when the rear trunk lid is opened, so that the loading opening is enlarged, further comprising a hinge device arranged between the rear trunk lid and the tensioning bow, wherein the hinge device is arranged and constructed to upwardly pivot the tensioning bow when the rear trunk lid is being opened, wherein the tensioning bow is supported on the vehicle body via a lever supported on the vehicle body.

* * * * *